United States Patent

Murén et al.

[11] Patent Number: 4,755,085
[45] Date of Patent: Jul. 5, 1988

[54] INDEXABLE CUTTING INSERT

[75] Inventors: Tord S. H. Murén, Gävle; Lars H. Ericksson, Kungsgården; Lars S. Birgersson, Järbo; Lars-Erik Gustafsson, Sandviken, all of Sweden

[73] Assignee: Santrade Limited, Lucerne, Switzerland

[21] Appl. No.: 5,211

[22] Filed: Jan. 20, 1987

[30] Foreign Application Priority Data

Feb. 10, 1986 [SE] Sweden .................................. 8600557

[51] Int. Cl.$^4$ .......................... B23B 27/06; B26D 1/00
[52] U.S. Cl. ...................................... 407/113; 407/114
[58] Field of Search .................................. 407/113, 114

[56] References Cited

U.S. PATENT DOCUMENTS

| | | |
|---|---|---|
| 3,780,409 | 12/1973 | Bartoszevicz et al. ............. 407/113 |
| 3,800,379 | 4/1974 | Hopkins .............................. 407/114 |
| 3,825,981 | 7/1974 | Cochran et al. .................... 407/113 |
| 4,044,439 | 8/1977 | Romagnolo ......................... 407/114 |
| 4,063,841 | 12/1977 | Niman ................................. 407/70 |
| 4,632,608 | 12/1986 | Blomberg et al. ................. 407/114 |
| 4,674,924 | 6/1987 | Carlsson et al. ................... 407/114 |

Primary Examiner—Frederick R. Schmidt
Assistant Examiner—William E. Terrell
Attorney, Agent, or Firm—Burns, Doane, Swecker & Mathis

[57] ABSTRACT

The invention relates to an indexable cutting insert for recessing. The insert (10) has a triangular basic shape and comprises three cutting edges. Each cutting edge is arranged at a projection (16) which at least partly is asymmetrically arranged relative to a line parallel with the working direction (I) of the insert. The insert has a good accessibility at work pieces having narrow spaces.

8 Claims, 3 Drawing Sheets

INDEXABLE CUTTING INSERT

BACKGROUND AND SUMMARY OF THE INVENTION

The present invention relates to an indexable cutting insert for recessing whose basic shape is triangular comprising an upper face, a lower face mainly parallel thereto and edge surfaces joining them. Each cutting corner of the cutting insert is provided with a projection which carries a cutting edge extending mainly perpendicularly to the working direction of the cutting insert. The edges of the projection which connect to the cutting edge diverge in said working direction such that the projection at least partly has an asymmetrical shape relative to the working direction.

Hitherto known triangular and indexable cutting inserts for recessing have configurations which require a lot of hard material. Hard material is expensive and therefore it is economically advantageous to reduce the amount thereof in each insert. The configuration of the known inserts demand holders which have a special pocket for each insert size. Furthermore the accessibility of the known inserts into narrow spaces is very limited.

An object of the present invention is to provide an indexable insert such that its configuration demands a reduced amount of hard material.

Another object is to shape the insert such that it fits into a standard type holder mainly regardless of the dimension of the cutting edge.

Another object is to provide an indexable insert with three cutting edges.

Further another object is to shape the insert such to get better accessibility during machining of work pieces having flanges.

THE DRAWINGS

The invention will be more closely described hereinafter in connection with the appended drawings.

DETAILED DESCRIPTION OF A PREFERRED EMBODIMENT OF THE INVENTION

Figure 1:
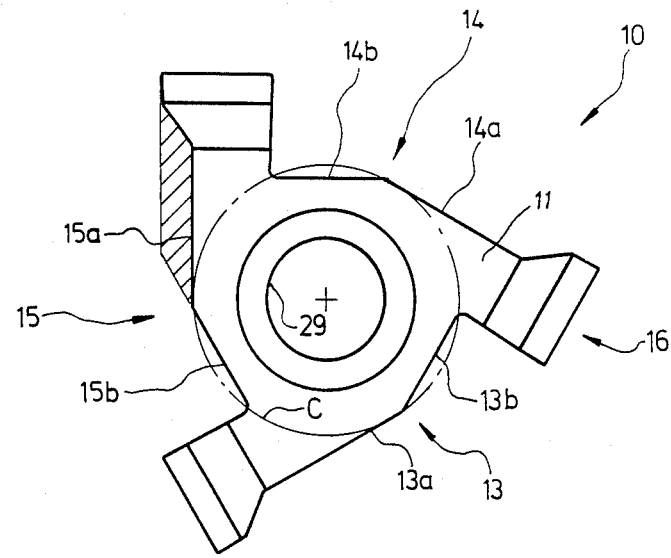
FIG. 1 shows a cutting insert for recessing according to the invention, in a top view.
Figure 2:
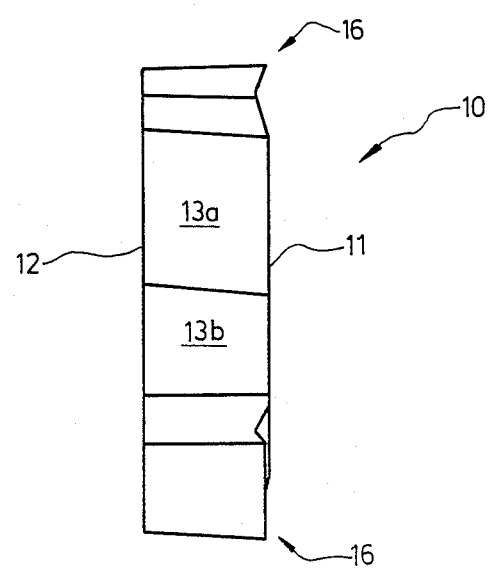
FIG. 2 shows the cutting insert in a side view.
Figure 3:
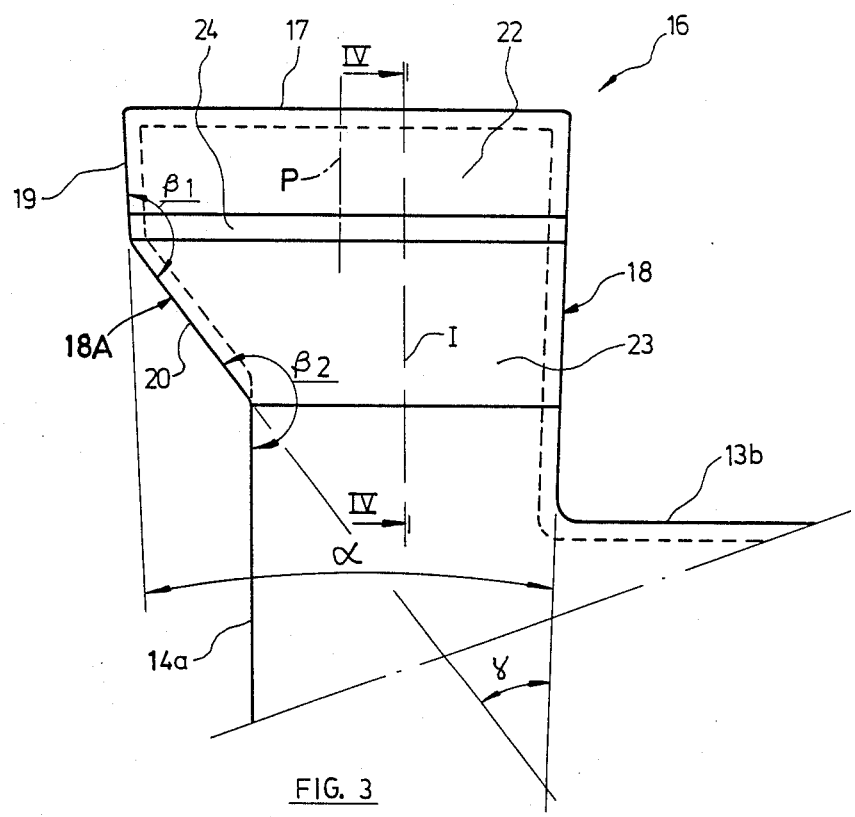
FIG. 3 shows a cutting corner of the insert in a top view.
Figure 4:
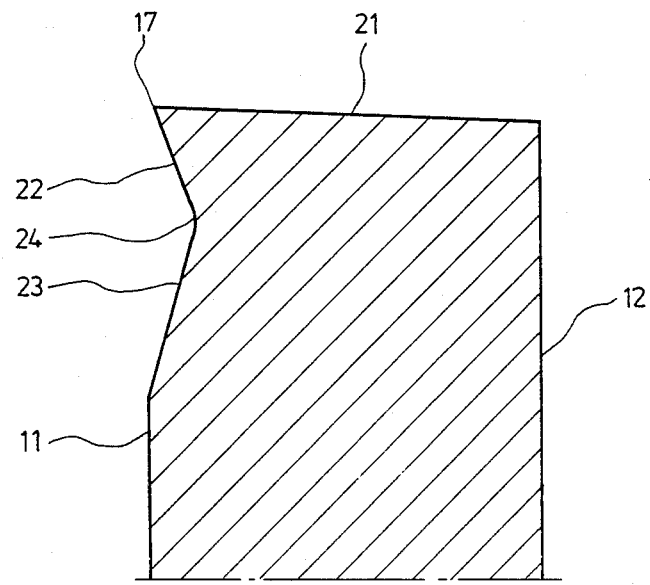
FIG. 4 shows a cross-section of the cutting corner according to the line IV—IV in FIG. 3.

FIGS. 1 to 4 show an indexable cutting insert 10 for recessing. The insert 10 has a triangular basic shape and comprises an upper face 11 and a lower face 12 and edge surfaces 13,14,15 connecting them. The faces 11 and 12 are mainly parallel. The edge surfaces 13–15 connect the faces mainly perpendicularly. The insert is provided with a central aperture 29 which extends mainly perpendicularly to the faces 11 and 12. Each edge surface, 13 for example, consists of two mutually convexly broken planar or concave portions 13a, 13b, a portion 13a of which is provided to be a support surface for the insert against a pocket. The portion 13b is provided to avoid contact with the work piece during the recessing operation. The portion 13a constitutes a leg of an imaginary triangle, defined by a circle C inscribed around the centre of the insert 10. The portion 13b forms a chord within the circle C. The insert has three identical cutting corners and only one corner is described hereinafter. A projection 16 is arranged at the cutting corner which connects the portions 13b and 14a. The projection carries a mainly straight cutting edge 17 which is mainly parallel with the portion 13b. The cutting edge 17 has ends which are connected to side edges 18, 18A which converge in a direction inwardly from the cutting edge. The side edge 18A comprises mutually angled first and second edges 19, 20. The cutting edge 17 is mainly perpendicular to the working direction denoted by I. The edges 18, 19 form an acute angle $\alpha$ with each other within the interval 1 to 10 degrees, preferably 3 to 5 degrees. The edge 18 keeps its direction until it connects to the portion 13b, whereas the edge 19 connects to the portion 14a via a mainly straight edge 20 which forms mainly obtuse internal angles $\beta_1$ and $\beta_2$ with the edge 19 and portion 14a, respectively. The angle $\beta_1$ is 130 to 150 degrees and the angle $\beta_2$ is 210 to 230 degrees. The edge 18 and the edge 20 form an acute angle $\gamma$ with each other which is 30 to 50 degrees. The surfaces below the edges 18 and 19 have clearance angles about 1 to 11 degrees. The surface 21 below the cutting edge 17 may also have this clearance angle. A rake face 22 slopes inwardly and downwardly from the cutting edge 17 and forms an acute angle with the surface 21. An inwardly and upwardly climbing rear surface 23 connects to the rake face via a curved surface or bottom 24 whose radius is about 0.5 mm. The bottom 24 extends mainly parallel with the cutting edge 17 and extends between the edges 18, 19. The rear surface 23 also connects to the upper face 11 of the insert. Alternatively the edge 20 can be concave or convex.

In FIG. 1 is shown a hatched area at the edge surface 15 which area illustrates the amount of hard material which is saved with the insert according to the present invention compared to known recessing inserts.

Figure 5:
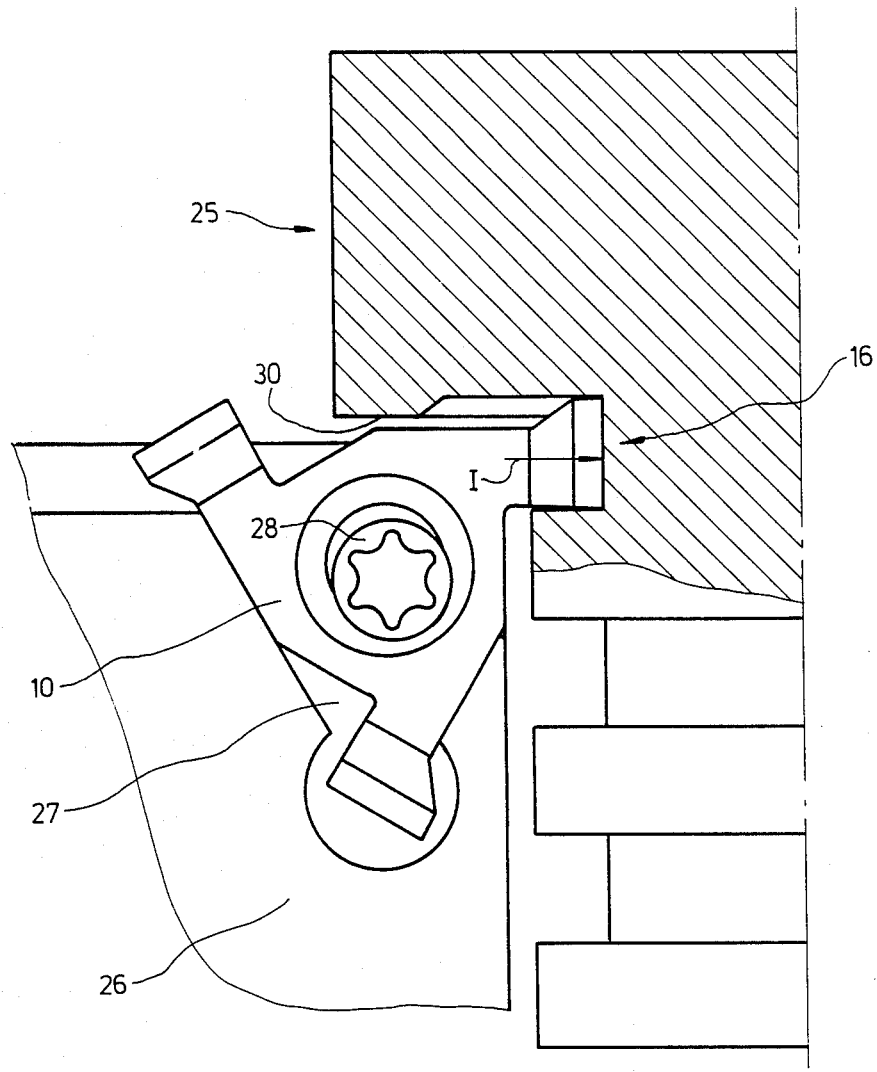
FIG. 5 shows a part of a tool, in a top view, for recessing comprising a cutting insert according to the invention.

FIG. 5 shows a part of a recessing tool in engagement with a partly sectioned round work piece 25. The tool comprises a holder 26 having a pocket 27, a screw 28 and an insert 10 according to the invention. The insert 10 is secured within the pocket by means of the screw 28, which engages in a threaded hole in the holder. The active cutting edge of the insert 10 has machined four grooves in the work piece. The work piece has an annular flange 30 which would counteract the formation of the axially innermost groove if a conventional insert be used. As the insert according to the invention has the above mentioned shape the innermost groove may be formed without problems. The passive projections are at least partly received by recesses in the holder 26.

The working direction or feed direction of the insert is illustrated by the arrow I around which the edges of the projection extend such that the outer part 18, 19 of the projection diverge symmetrically whereas the edges 18, 19 at the inner part of the projection diverge asymmetrically around the working direction in direction from the insert. Thus, each projection itself is asymmetrical relative to an imaginary plane P which is disposed perpendicular to the surfaces 11, 12 and which bisects the cutting edge 17.

Thus, the invention relates to an indexable cutting insert for recessing. The shape of the insert gives a good accessibility at narrow spaces and saves hard material. Furthermore, standard type holders can be used for the indexable insert.

We claim:

1. A three-cornered cutting insert for recessing, said insert including upper and lower parallel faces and a plurality of edge surfaces interconnecting said faces to form said three corners of said insert, a projection disposed at each corner and extending outwardly away from said faces, each projection including a cutting edge lying in a plane disposed parallel to said faces, each projection including a pair of side edges extending inwardly from opposite ends of a respective cutting edge, said side edges converging inwardly toward said faces and intersecting respective ones of said edge surfaces to form angles therewith, each said projection being configured asymmetrically relative to an imaginary plane which is disposed perpendicular to said faces and which bisects said cutting edge, a portion of each of said edge surfaces lying tangent to an imaginary circle having a center coincident with a center of said insert, said portions of said edge surfaces defining an imaginary triangle, each projection arranged at least partly outside of said imaginary triangle.

2. An indexable cutting insert according to claim 1, wherein one of said side edges of each projection includes first and second edge portions, said first edge portion intersecting said cutting edge, said first edge portion and the other of said side edges converging symmetrically relative to said imaginary plane, said second edge portion extending inwardly from said first edge portion and forming an obtuse angle therewith, whereby said second edge portion and said other side edge converge non-symmetrically relative to said imaginary plane.

3. An indexable cutting insert according to claim 2, wherein said first edge portion forms an angle of from 1 to 11 degrees with said other side edge, said second edge portion forming an angle of from 30 to 50 degrees with said other side edge.

4. An indexable cutting insert according to claim 2, wherein said second edge portion intersects one of said edge surfaces and forms an additional obtuse angle therewith which is larger than said first-named obtuse angle.

5. An indexable cutting insert according to claim 4, wherein said first-named obtuse angle is from 130 to 150 degrees, and said additional obtuse angle is from 210 to 230 degrees.

6. An indexable cutting insert according to claim 2, wherein each of said edge surfaces is of generally concave shape and formed by first and second angularly related edge surface portions, each said first edge surface portion being tangent to said imaginary circle and each said second edge surface portion forming a chord of said imaginary circle.

7. An indexable cutting insert according to claim 1 including a rake face sloping inwardly from said cutting edge in a direction toward a plane of said lower face and bordered by said side edges, said rake face terminating short of said lower face to form a bottom of said rake face extending parallel to said cutting edge, a rear face sloping inwardly from said bottom and intersecting said upper face.

8. An indexable cutting insert according to claim 1 including a central aperture extending through, and perpendicular to, said upper and lower faces.

* * * * *